(12) United States Patent
Harutyunyan et al.

(10) Patent No.: US 10,195,668 B2
(45) Date of Patent: Feb. 5, 2019

(54) METHOD FOR CONTINUOUS AND CONTROLLABLE PRODUCTION OF SINGLE WALLED CARBON NANOTUBES

(71) Applicant: Honda Motor Co., Ltd., Tokyo (JP)

(72) Inventors: Avetik Harutyunyan, Columbus, OH (US); Rahul Rao, Yellow Springs, OH (US); Nam Hawn Chou, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/794,931

(22) Filed: Jul. 9, 2015

(65) Prior Publication Data

US 2016/0009557 A1 Jan. 14, 2016

Related U.S. Application Data

(60) Provisional application No. 62/022,398, filed on Jul. 9, 2014.

(51) Int. Cl.
*C01B 32/162* (2017.01)
*B22F 9/24* (2006.01)
(Continued)

(52) U.S. Cl.
CPC .............. *B22F 9/24* (2013.01); *B01J 23/08* (2013.01); *B01J 23/462* (2013.01); *B01J 35/0013* (2013.01); *B01J 37/009* (2013.01); *B01J 37/18* (2013.01); *B22F 1/0044* (2013.01); *C01B 32/162* (2017.08); *C01B 32/164* (2017.08); *C01G 15/00* (2013.01); *B22F 2009/245* (2013.01); *B22F 2201/50* (2013.01); *B22F 2301/30* (2013.01); *B22F 2998/10* (2013.01); *B82Y 30/00* (2013.01); *B82Y 40/00* (2013.01); *C01B 2202/02* (2013.01); *Y10S 977/75* (2013.01); *Y10S 977/773* (2013.01); *Y10S 977/843* (2013.01); *Y10S 977/896* (2013.01)

(58) Field of Classification Search
CPC ... C01B 31/0233; B82Y 40/00; Y10S 977/75; Y10S 977/843
See application file for complete search history.

(56) References Cited

U.S. PATENT DOCUMENTS 6,756,025 B2 6/2004 Colbert et al.
7,396,798 B2 7/2008 Ma et al.
(Continued)

FOREIGN PATENT DOCUMENTS

JP 2016159225 A 9/2016
WO 2013038674 A1 3/2013

OTHER PUBLICATIONS

Takagi, Daisuke, et al. "Carbon nanotube growth from semiconductor nanoparticles." Nano letters 7.8 (2007): 2272-2275.*
(Continued)

*Primary Examiner* — Richard M Rump
(74) *Attorney, Agent, or Firm* — Armstrong Teasdale LLP

(57) ABSTRACT

The present disclosure is directed to methods for producing a single-walled carbon nanotube in a chemical vapor deposition (CVD) reactor. The methods comprise contacting liquid catalyst droplets and a carbon source in the reactor, and forming a single walled carbon nanotube at the surface of the liquid catalyst droplets.

26 Claims, 11 Drawing Sheets

(51) Int. Cl.
*C01G 15/00* (2006.01)
*B01J 23/08* (2006.01)
*B01J 23/46* (2006.01)
*B01J 35/00* (2006.01)
*B01J 37/00* (2006.01)
*B01J 37/18* (2006.01)
*B22F 1/00* (2006.01)
*C01B 32/164* (2017.01)
*B82Y 30/00* (2011.01)
*B82Y 40/00* (2011.01)

(56) References Cited

U.S. PATENT DOCUMENTS

| | | | |
|---|---|---|---|
| 7,591,989 B2 | 9/2009 | Olivier et al. | |
| 7,871,591 B2 | 1/2011 | Harutyunyan et al. | |
| 7,879,300 B2 | 2/2011 | Mayne et al. | |
| 8,071,906 B2 | 12/2011 | Smiljanic et al. | |
| 8,163,263 B2 | 4/2012 | Harutyunyan et al. | |
| 2005/0287064 A1* | 12/2005 | Mayne | B82Y 30/00 423/445 B |
| 2008/0102019 A1 | 5/2008 | Jeong et al. | |
| 2008/0124482 A1 | 5/2008 | Smiljanic et al. | |
| 2008/0226536 A1 | 9/2008 | Smiljanic et al. | |
| 2012/0237436 A1 | 9/2012 | Harutyunyan et al. | |
| 2014/0377126 A1 | 12/2014 | Kitagawa et al. | |
| 2017/0113213 A1* | 4/2017 | Brown | B01J 31/0215 |

OTHER PUBLICATIONS

Takagi, Daisuke, et al. "Single-walled carbon nanotube growth from highly activated metal nanoparticles." Nano Letters 6.12 (2006): 2642-2645.*

Bhaviripudi, Sreekar, et al. "CVD synthesis of single-walled carbon nanotubes from gold nanoparticle catalysts." Journal of the American Chemical Society 129.6 (2007): 1516-1517.*

Jiang, Kaili, et al. "A vapor-liquid-solid model for chemical vapor deposition growth of carbon nanotubes." Journal of nanoscience and nanotechnology 7.4-5 (2007): 1494-1504.*

Moisala, Anna, et al. "Single-walled carbon nanotube synthesis using ferrocene and iron pentacarbonyl in a laminar flow reactor." Chemical Engineering Science 61.13 (2006): 4393-4402.*

Supplemental Information for "Single-Walled Carbon Nanotube Growth from Highly Activated Metal Nanoparticles", Takagi et al. (2006).*

Harutyunyan, Avetik R. "The catalyst for growing single-walled carbon nanotubes by catalytic chemical vapor deposition method." Journal of nanoscience and nanotechnology 9.4 (2009): 2480-2495.*

Ago, Hiroki, et al. "Gas-phase synthesis of single-wall carbon nanotubes from colloidal solution of metal nanoparticles." The Journal of Physical Chemistry B 105.43 (2001): 10453-10456.*

Y. Sato, T. Osawa, and S. Noda, "Separate control of catalyst particle formation and single-walled carbon nanotube growth in floating catalyst synthesis", International conference on the science and application of nanotubes (NT11), P87, Cambridge, UK (poster, Jul. 11, 2011).*

Rao, Rahul, Kurt G. Eyink, and Benji Maruyama. "Single-walled carbon nanotube growth from liquid gallium and indium." Carbon 48.13 (2010): 3971-3973.*

Chung, Sang-Ho, et al. "Highly dispersed ruthenium nanoparticle-embedded mesoporous silica as a catalyst for the production of y-butyrolactone from succinic anhydride." Journal of nanoscience and nanotechnology 13.11 (2013): 7701-7706.

Chakroune, Nassira, et al. "Acetate-and thiol-capped monodisperse ruthenium nanoparticles: XPS, XAS, and HRTEM studies." Langmuir 21.15 (2005): 6788-6796.

Webelements—Ruthenium. <https://www.webelements.com/ruthenium/crystal_structure.html> Accessed Sep. 22, 2016.

Yang, J., Jim Yang Lee, and Heng-Phan Too. "A phase transfer identification of core-shell structures in Au—Ru nanoparticles." Analytica chimica acta 537.1 (2005): 279-284.

Morawa Eblagon, Katarzyna et al., "Size-Controlled Preparation of Ruthenium Nanoparticles Using Polyaromatic Amine-Containing Compounds as Hydrogenation Nanocatalyst Precursors," International Journal of Nanoparticles 3.2, 2010, pp. 104-122.

Harpness, R et al., "Controlling the Agglomeration of Anisotropic Ru Nanoparticles by the Microwave-Polyol Process," Journal of Colloid and Interface Science 287.2, 2005, pp. 678-684.

Lim, Tech H. et al., "Solution Synthesis of Monodisperse Indium Nanoparticles and Highly Faceted Indium Polyhedra", Crystal Growth & Design 10.9, 2010, pp. 3854-3858.

Redondas, Cintia et al., "Bottom-Up Synthesis of Indium (0) Nanoparticles and its Application for the Allylation of Benzaldehyde. An Experimental and Theoretical Study," 2013, 8 pp.

Khanna, P.K. et al., "Colloidal Synthesis of Indium Nanoparticles by Sodium Reduction Method," Materials Letters 59.8, 2005, pp. 1032-1036.

Khanna, P.K. et al., "Synthesis of Indium Phosphide Nanoparticles via Catalytic Cleavage of Phosphorous Carbon Bond in N-Trioctylphosphine by Indium," Materials Chemistry and Physics 92.1, 2005, pp. 54-58.

Moisala, Anna et al., "The Role of Metal Nanoparticles in the Catalytic Production of Single-Walled Carbon Nanotubes—a Review," Journal of Physics: Condensed Matter, Matter 15, 2003, pp. S3011-S3035.

* cited by examiner

_US 10,195,668 B2_

METHOD FOR CONTINUOUS AND CONTROLLABLE PRODUCTION OF SINGLE WALLED CARBON NANOTUBES

This application is a non-provisional application and claims priority to U.S. Provisional Patent Application Ser. No. 62/022,398 filed Jul. 9, 2014 for "METHOD FOR CONTINUOUS AND CONTROLLABLE PRODUCTION OF SINGLE WALLED CARBON NANOTUBES", which is hereby incorporated by reference in their entirety.

BACKGROUND

The present disclosure relates to methods for producing a single-walled carbon nanotube in a chemical vapor deposition (CVD) reactor comprising contacting liquid catalyst droplets and a carbon source in the reactor, and forming a single walled carbon nanotube at the surface of the liquid catalyst droplets.

Single-walled carbon nanotubes (SWNT) are increasingly becoming of interest for various applications in nanotechnology because of their unique electronic structures, which gives them exceptional thermal, mechanical, and electrical properties. For example, SWNT can be used in electronics, energy devices, medicine, and composite materials in order to obtain desirable physical and chemical properties. These uses require methods for producing significant quantities of SWNT.

Various processes are used to produce SWNT including physical methods (e.g., electrical arc, laser ablation) and chemical methods (e.g., pyrolysis, chemical vapor deposition). Bench production yield from these methods is low and expensive. In addition, the product is not homogenous and contains tubes with broad diameter distributions and various helicity and thereby various electrical and mechanical properties, which limit their broader applications. Accordingly, there is a need in the art for methods for controllably producing SWNT with narrow distributions of structural helices, and high yields.

BRIEF SUMMARY

It has been found that single-walled carbon nanotubes may be produced using a chemical vapor deposition (CVD) method in which liquid catalytic droplets are contacted with a carbon source in the reactor. The resulting single walled carbon nanotube is formed at the surface of the liquid catalyst droplets. Use of liquid catalyst droplets provides a smooth, spherical shape that is not disturbed by various facets and surface defects inherent in solid catalysts and supports, and thus, it provides a more uniform surface for nanotube growth that produces a more homogeneous nanotube product, depending only on the diameter of the droplet.

Accordingly, in one aspect, the present disclosure is directed to a method for producing a single-walled carbon nanotube in a chemical vapor deposition (CVD) reactor. The method includes contacting liquid catalyst droplets and a carbon source in the reactor; and forming a single walled carbon nanotube at the surface of the liquid catalyst droplets.

In another aspect, the present disclosure is directed to a method for producing a single-walled carbon nanotube in a chemical vapor deposition (CVD) reactor. The method includes introducing colloidal solid catalyst particles into a reactor at a decomposition temperature above the melting point of the catalyst particles to form liquid catalyst droplets; contacting the liquid catalyst droplets and a carbon source in the reactor at a synthesis temperature above the decomposition temperature; and forming a single walled carbon nanotube at the surface of the liquid catalyst droplets.

In yet another aspect, the present disclosure is directed to a method of producing a single-walled carbon nanotube. The method includes injecting a catalyst metalorganic precursor (e.g., metallocene) into a chemical vapor deposition (CVD) reactor at a decomposition temperature above the melting point of the catalyst to remove the organic material and to forming liquid catalyst droplets; contacting the liquid catalyst droplets and a carbon source in the reactor at a synthesis temperature above the decomposition temperature; and growing the single-walled carbon nanotube at the surface of the liquid catalyst droplets.

In yet another aspect, the present disclosure is directed to a method of producing a single-walled carbon nanotube. The method includes injection of vapor of a powdered catalyst metalorganic precursor (e.g., metallocene) into a carrier gas in a chemical vapor deposition (CVD) reactor at a decomposition temperature above the melting point of the catalyst to remove the organic material and to form liquid catalyst droplets; transporting the liquid catalyst droplets from the decomposition zone of the reactor to a growing zone of the reactor with the carrier gas; contacting the liquid catalyst droplets and a carbon source in the reactor at a synthesis temperature above the decomposition temperature; and growing the single-walled carbon nanotube at the surface of the liquid catalyst droplets.

The features, functions, and advantages described herein may be achieved independently in various embodiments of the present disclosure or may be combined in yet other embodiments, further details of which may be seen with reference to the following description and drawings.

Figure 1:
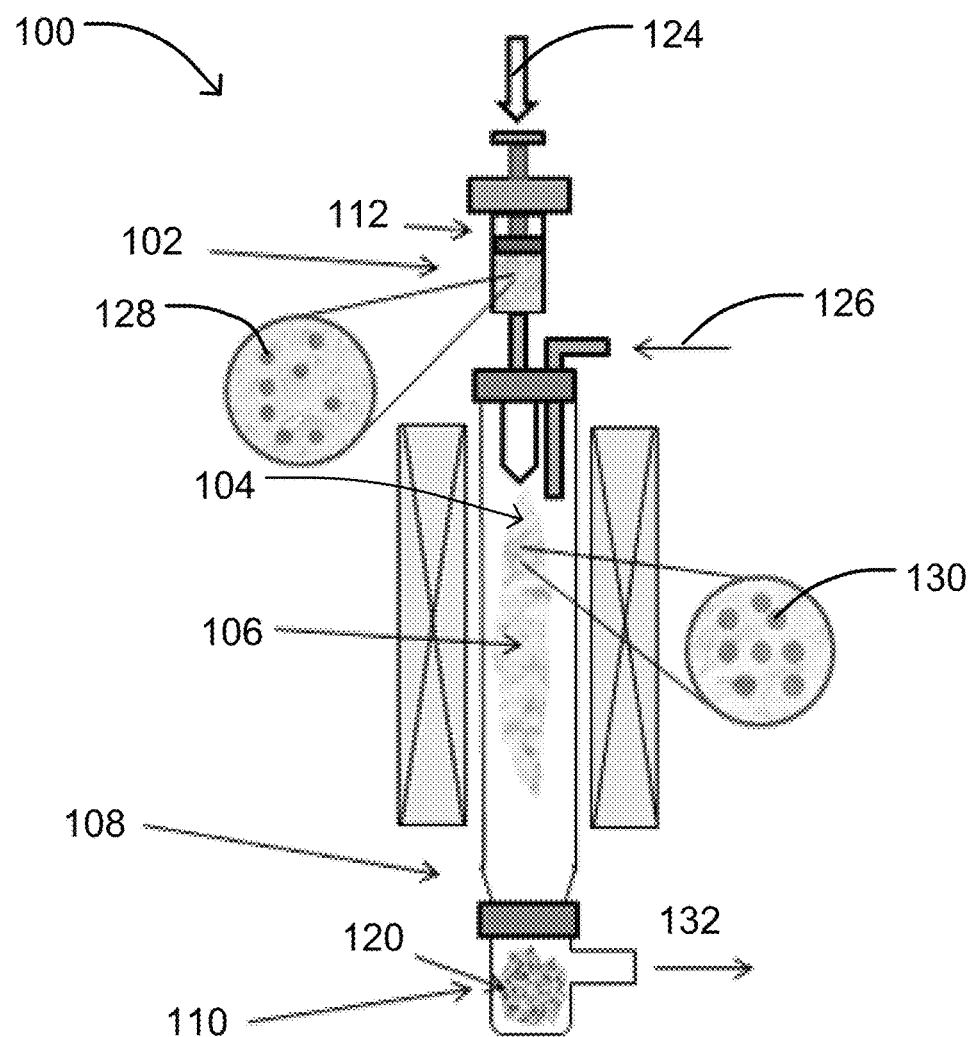
FIG. 1 shows an example implementation of a vertical CVD reactor utilized in the methods described herein.

Although specific features of various implementations may be shown in some drawings and not in others, this is for convenience only. Any feature of any drawing may be referenced and/or claimed in combination with any feature of any other drawing.

DETAILED DESCRIPTION

The subject matter described herein relates generally to methods for producing a single-walled carbon nanotube by a chemical vapor deposition (CVD) method. Generally, the methods include contacting liquid catalyst droplets and a carbon source in the reactor, and forming a single walled carbon nanotube at the surface of the liquid catalyst droplets. The following detailed description illustrates implementations of the subject matter described in this application by way of example and not by way of limitation.

Carbon nanotubes are allotropes of carbon, typically with a substantially cylindrical nanostructure. Carbon nanotubes are categorized as single-walled nanotubes (SWNT) and multi-walled nanotubes (MWNT). SWNT have a single layer of carbon comprising its microstructure while MWNT are comprised of several layers. While described herein with respect to SWNT, it should be understood that the methods of the present disclosure are applicable to the formation of both SWNT and MWNT.

Catalysts used in the methods of the present disclosure are particularly suitable to initiate and increase the rate of chemical reactions which produce SWNT. More specifically, the catalysts of the present disclosure interact with a carbon source, further described below, to form SWNT. The catalysts serve as the formation surface for SWNT. Any catalysts and catalyst mixtures having a melting point lower than the SWNT synthesis temperature may be used in the present disclosure. More specifically, the catalysts described herein may include materials including iron, nickel, cobalt, copper, chromium, indium, gallium, platinum, manganese, cerium, europium, ytterbium, silver, gold, zinc, cadmium, and lanthanum, any other catalysts known in the art, and compounds and combinations thereof. In particularly suitable embodiments, the catalysts include indium, gallium, and combinations thereof.

The catalysts used in the methods of the present disclosure may be prepared in many different forms. Non-limiting examples include a catalyst precursor material that is formed as a solid catalyst particle, a catalyst precursor material that is formed as a solid that is dispersed in a liquid, or a catalyst precursor material that is dissolved in a solvent. In an illustrative example, the catalyst precursor material is formed in a colloidal solid catalyst particle. The colloidal solid catalyst particle may be dispersed in a liquid. In a non-limiting example, the liquid may be an organic solution. In a non-limiting example, the catalyst precursor material is a colloidal solid catalyst particle, and the liquid has a decomposition temperature lower than the vaporization temperature of the catalyst.

In another non-limiting example, the catalyst precursor materials may be a catalyst metalorganic precursor (e.g., metallocene). Metallocene precursors of the present disclosure typically include catalyst metals bonded to organic material (e.g., cyclopentadienyl anions). Non-limiting examples of suitable catalyst metalorganic precursors include: gallium acetylacetonate, indium acetylacetonate, ruthenium acetylacetonate, gallium acetate, indium acetate, ruthenium acetate, gallium nitrate, indium nitrate, ruthenium nitrate, gallium sulfate, indium sulfate, ruthenium sulfate, gallium chloride, indium chloride, ruthenium chloride, and any combination thereof. It is to be understood that the metallocene precursor may also be provided as a solid powder, as a solid dispersed in a liquid, or dissolved in a solvent.

Catalysts used in the methods of the present disclosure, described more fully above, are configured to form liquid catalyst droplets that provide surfaces for the growth of SWNT during catalytic decomposition of a carbon source. The carbon source used in the methods of the present disclosure include elemental carbon and any carbon containing source capable of providing elemental carbon for the formation of SWNT. In general, any carbon containing gas that does not pyrolize at temperatures up to 500° C. to 1000° C. can be used. Non-limiting examples include carbon monoxide, aliphatic hydrocarbons, both saturated and unsaturated, such as methane, ethane, propane, butane, pentane, hexane, acetylene, ethylene, and propylene; oxygenated hydrocarbons such as acetone, methanol, and ethanol; aromatic hydrocarbons such as benzene, toluene, and naphthalene; and mixtures of the above, for example carbon monoxide and methane. The carbon source may optionally be mixed with a diluent gas such as hydrogen, helium, argon, neon, krypton and xenon or a mixture thereof.

Figure 3A:
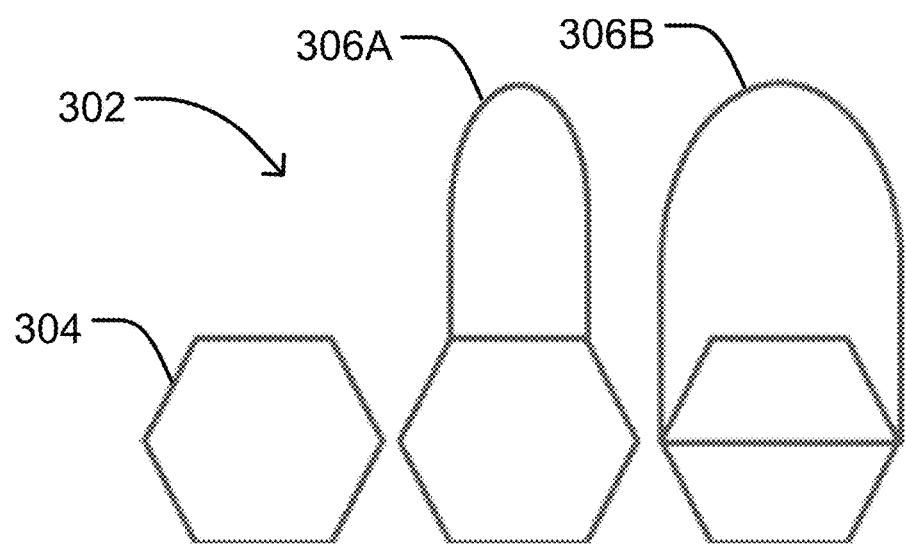
FIG. 3A shows a solid catalyst particle with facets or surface defects.
Figure 3B:
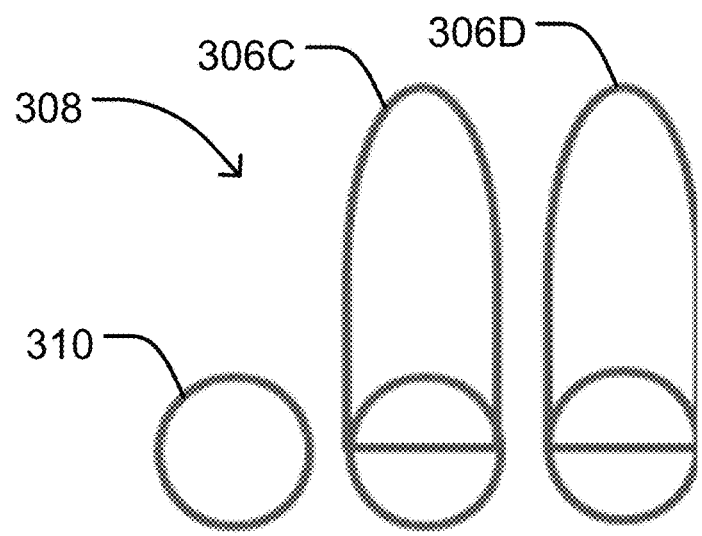
FIG. 3B shows a liquid catalyst droplet of the present method.

The catalyst droplets in the described methods provides for a decomposition reaction of the carbon source to elemental carbon with a lower activation energy. Still in another example, the catalyst droplets provide for a formation reaction of elemental carbon to SWNT with a lower activation energy. As shown in FIG. 3A, solid catalytic material 302 includes facets or defects 304 on the surface where the nanotube 306A/306B grows during synthesis. Such surface variations result in a heterogeneous nanotube product, as evidenced by the variation in size between nanotubes 306A and 306B. In contrast, a support free liquid catalyst droplet 308 as used in the methods of the present disclosure and as shown in FIG. 3B provides a smooth, spherical shape 310 that is not disturbed by various facets and surface defects inherent in solid catalytic material and supports. Therefore, it provides a more uniform surface for nanotube growth that produces a more homogeneous nanotube product, as evidenced by the uniform sizes of nanotubes 306C and 306D formed on the free liquid catalyst droplet 308.

In some embodiments of the present disclosure, the reactants used in the chemical process of forming SWNT include a carrier gas In methods of the present disclosure, the carrier gas is typically a gas used as a mass transport mechanism but may also be used to dilute the reactants or slow the reaction rate. The carrier gas used in methods of the present disclosure may include one or more inert gases (e.g., nitrogen, helium, neon, argon, etc.) or any other gas that may be suitable for improving the formation of SWNT as known in the art. Non-limiting examples of other suitable gases include: hydrogen, carbon dioxide, ammonia, and any combination thereof.

In some embodiments of the present disclosure, the carrier gas may transport the reactants through the various zones of the reactor, promote mixing of the liquid catalyst droplets and carbon source, inhibit the introduction of unwanted gaseous reactants including, but not limited, to air or oxygen, and/or maintain the reactants in a suitable position within the zones of the reactor. By way of non-limiting example, the carrier gas may offset the effect of gravity on the various particulate reactants within a vertically-oriented reactor, thereby maintaining the particulate reactants at a suitable vertical position within the reactor. Non-limiting examples of particulate reactants maintained in a suitable position within the reactor by the carrier gas include: catalyst particles, liquid catalyst droplets, and SWNT produced by the reactor.

In some embodiments of the present disclosure, the carrier gas may be injected or inserted into the reactor at a flow rate ranging from about 500 sccm (standard cubic cm/min.) to about 2000 sccm. In various other embodiments of the present disclosure, the carrier gas may be injected or inserted into the reactor at a flow rate ranging from about 500 sccm to about 600 sccm, 550 sccm to about 650 sccm, 600 sccm to about 700 sccm, 650 sccm to about 750 sccm, 700 sccm to about 800 sccm, 750 sccm to about 850 sccm, 800 sccm to about 900 sccm, 850 sccm to about 950 sccm, 900 sccm to about 1000 sccm, 950 sccm to about 1050 sccm, 1000 sccm to about 1200 sccm, 1100 sccm to about 1300 sccm, 1200 sccm to about 1400 sccm, 1300 sccm to about 1500 sccm, 1400 sccm to about 1600 sccm, 1500 sccm to about 1700 sccm, 1600 sccm to about 1800 sccm, 1700 sccm to about 1900 sccm, and from about 1800 sccm to about 2000 sccm.

Figure 2:
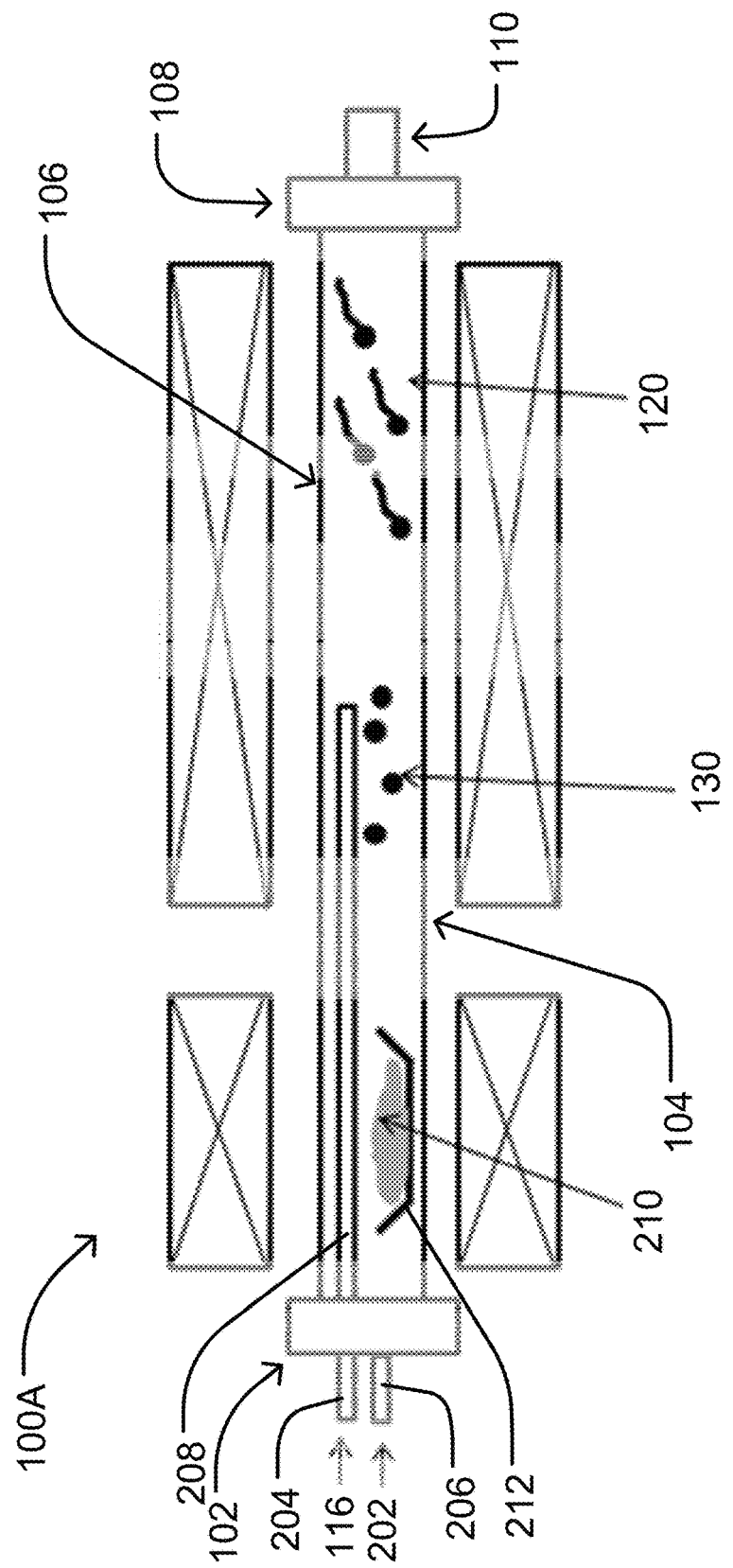
FIG. 2 shows an example implementation of a horizontal CVD reactor utilized in the methods described herein.

The liquid catalyst droplets and carbon source are generally contacted to form the carbon nanotubes in any type of reactor known in the nanotube formation art. Generally, carbon nanotubes are formed by a number of different chemical processes including pyrolysis and chemical vapor deposition (CVD) in a number of different types of reactors. Such reactors are suitable for methods of the present disclosure. More particularly, reactors of the present disclosure may include a plurality of zones including one or more of an injection zone, a decomposition zone, a size selection zone, a growing zone, a cooling zone, and a collection zone. It should be understood by one skilled in the art that the reactors used in the methods of the present disclosure may include any combination of these zones in any suitable orientation without departing for the scope of the present disclosure. Reactors used in the methods of the present disclosure are configured both horizontally and vertically. FIGS. 1 and 2 provide non-limiting examples of CVD reactors that can be used in the methods of the present disclosure.

FIG. 1 is a schematic illustration of an exemplary vertically-oriented CVD reactor 100 in one embodiment. The CVD reactor 100 may include an injection zone 102 to introduce the catalyst material and carbon source to the CVD reactor 100, a decomposition zone 104 to partially or completely decompose one or more of the reagents within the CVD reactor 100, a growing zone 106 to grow SWNT, a cooling zone 108 to cool the reactants and/or products in the CVD reactor 100, and a collection zone 110 to collect products and unreacted reactants from the CVD reactor 100.

As illustrated in FIG. 1, the injection zone 102 may be configured to inject or insert the catalyst material or catalyst precursor material 124, and the carbon source 126 into the reactor 100. In particularly suitable embodiments, the injection zone 102 includes one or more feed mechanisms (e.g., a syringe, pump, atomizer, nozzle, etc.), which are capable of controlling a number of different variables with respect to the catalyst or catalyst precursor 124, and carbon source 126 entering the reactor 100 including, but not limited to: volume, ratio, flow rate, and pressure. The injection zone 102 may also operate to increase the surface area of the reactants as they enter the reactor and/or contact the catalyst 124 and the carbon source 126. In one embodiment, the injection zone may include an injector 112 to inject the catalyst or catalyst precursor 124 into the injection zone 102 for subsequent transport to other zones of the reactor 100 including, but not limited to, the decomposition zone 104.

The decomposition zone 104 of the reactor 100 used in the methods of the present disclosure may be configured to partially or completely decompose one or more of the catalyst precursor material 124, carbon source 126 and any liquids entering or exiting the reactor 100. For example, the decomposition zone 104 may be configured to evaporate or decompose a liquid or solvent in which the catalyst precursor 124 may be dispersed or otherwise dissolved, transform the catalyst precursor 124 to liquid catalyst droplets, melt solid catalyst material 128 introduced to the decomposition zone 104 to form liquid catalyst droplets 130, maintain liquid catalyst droplets 130 introduced to the decomposition zone 104, or any combination thereof. The decomposition zone 104 may be maintained at optimal temperature, pressure, and/or pH conditions to facilitate such processes. The decomposition zone 104 may be maintained at a temperature above the melting point of the solid catalyst material 124 used in the methods, but below the vaporization temperature of the resulting liquid catalyst droplets 130. Accordingly, the temperature of the decomposition zone may be adjusted to accommodate the selected catalyst material 124 and carbon source 126. The decomposition zone 104 may be heated with any type of heating mechanism without limitation. In one non-limiting example, the decomposition zone 104 may include a plasma (not illustrated) to transform the catalyst precursor 124 to catalyst particles 128.

In one embodiment, the decomposition zone 104 may be maintained at a decomposition temperature ranging from about 150° C. to about 400° C. In another embodiment, the decomposition zone 104 may be maintained at a decomposition temperature ranging from about 200° C. to about 300° C. In other embodiments, the decomposition zone 104 may be maintained at a decomposition temperature ranging from about 150° C. to about 170° C., from about 160° C. to about 180° C., from about 170° C. to about 190° C., from about 180° C. to about 200° C., from about 190° C. to about 210° C., from about 200° C. to about 220° C., from about 210° C. to about 230° C., from about 220° C. to about 240° C., from about 230° C. to about 250° C., from about 240° C. to about 260° C., from about 250° C. to about 270° C., from about 260° C. to about 280° C., from about 270° C. to about 290° C., from about 280° C. to about 300° C., from about 290° C. to about 310° C., from about 300° C. to about 320° C., from about 310° C. to about 330° C., from about 320° C. to about 340° C., from about 330° C. to about 350° C., from about 340° C. to about 360° C., from about 350° C. to about 370° C., from about 360° C. to about 380° C., from about 370° C. to about 390° C., and from about 380° C. to about 400° C.

The decomposition zone 104 of the reactor 100 may also serve as the area for contacting the liquid catalyst droplets 130 and the carbon source 126. Therefore, the decomposition zone 104 may be maintained at a decomposition temperature selected to allow for the catalytic decomposition of the carbon source 126 and subsequent growth of the single-walled carbon nanotubes (SWNT) 120 on the liquid catalyst droplets 130 in the growing zone 106.

The growing zone 106 of the reactor 100 used in the methods of the present disclosure is typically configured to grow SWNT 120. To facilitate SWNT growth, the growing zone 106 may be maintained at optimal temperature and/or pressure conditions. In one embodiment, the growing zone 106 may be maintained at a synthesis temperature ranging from about 500° C. to about 1300° C. In another embodiment, the growing zone 106 may be maintained at a synthesis temperature ranging from about 800° C. to about 1200° C. In an additional embodiment, the growing zone 106 may be maintained at a synthesis temperature ranging from about 900° C. to about 1050° C.

In other additional embodiments, the growing zone 106 may be maintained at a synthesis temperature ranging from about 500° C. to about 600° C., from about 550° C. to about 650° C., from about 600° C. to about 700° C., from about 650° C. to about 750° C., from about 700° C. to about 800° C., from about 750° C. to about 850° C., from about 800° C. to about 900° C., from about 850° C. to about 950° C., from about 900° C. to about 1000° C., from about 950° C. to about 1050° C., from about 1000° C. to about 1100° C., from about 1050° C. to about 1150° C., from about 1100° C. to about 1200° C., from about 1150° C. to about 1250° C., and from about 1200° C. to about 1300° C.

The cooling zone 108 of the reactor 100 used in the methods of the present disclosure is typically configured to cool the reactants and/or products in the reactor 100. In particularly suitable embodiments, the cooling zone 108 is maintained at a cooling temperature below the solidification temperature of one or more reactants or products so as to initiate solidification, freezing, or deposition.

The collection zone 110 of the reactor 100 used in the methods of the present disclosure is typically configured to collect the SWNT 120 produced within the growth zone 106 as well as any unreacted reactants 132 from the reactor 100. In particularly suitable embodiments, the collection zone 110 is situated at an end of the reactor 100 opposite the injection zone 102.

FIG. 2 is a schematic illustration of an exemplary horizontally-oriented CVD reactor 100A in one embodiment. The CVD reactor 100 may include an injection zone 102 to introduce the carbon source 116 and a carrier gas 202 to the CVD reactor 100, a decomposition zone 104 to partially or completely decompose one or more of the reagents within the CVD reactor 100, a growing zone 106 to grow SWNT, a cooling zone 108 to cool the SWNT products, and a collection zone 110 to collect the SWNT products and unreacted reactants from the CVD reactor 100.

The injection zone 102 of the reactor 100A may be configured to inject or insert the carbon source 126 and a carrier gas 202 into the reactor 100A. In particularly suitable embodiments, the injection zone 102 includes one or more feed mechanisms (e.g., a syringe, pump, atomizer, nozzle, etc.), which are capable of controlling a number of different variables with respect to the carbon source 126 and the carrier gas 202 entering the reactor 100A including, but not limited to: volume, ratio, flow rate, and pressure. As illustrated in FIG. 2, one feed mechanism 204 may include an elongated conduit 208 to introduce the carbon source 116 into one end of the growing zone 106 of the reactor 100A. In another aspect, a second feed mechanism 206 may be configured to introduce the carrier gas 202 used to transport the reactants through the reactor 100A into the decomposition zone 104.

As illustrated in FIG. 2, the decomposition zone 104 may be configured to receive a powdered catalyst metallocene precursor 210 in a carrier 212. The decomposition zone 104 may be further configured to partially or completely decompose the powdered catalyst metallocene precursor 210 and to form catalyst liquid droplets 130. The decomposition zone 104 may be maintained at optimal temperature, pressure, and/or pH conditions to facilitate such processes. The decomposition zone 104 may be maintained at a temperature above the melting point of the solid catalyst material 124 used in the methods, but below the vaporization temperature of the resulting liquid catalyst droplets 130. Accordingly, the temperature of the decomposition zone may be adjusted to accommodate the selected catalyst material 124 and carbon source 126.

In one embodiment, the decomposition zone 104 may be maintained at a decomposition temperature ranging from about 200° C. to about 300° C. In other embodiments, the decomposition zone 104 may be maintained at a decomposition temperature ranging from about 200° C. to about 220° C., from about 210° C. to about 230° C., from about 220° C. to about 240° C., from about 230° C. to about 250° C., from about 240° C. to about 260° C., from about 250° C. to about 270° C., from about 260° C. to about 280° C., from about 270° C. to about 290° C., and from about 280° C. to about 300° C.

The growing zone 106 of the reactor 100A used in the methods of the present disclosure is typically configured to grow SWNT 120. To facilitate SWNT growth, the growing zone 106 may be maintained at an optimal temperature and/or pressure conditions. Any form of heating may be provided to maintain the growing zone 106 at the desired synthesis temperature. In one embodiment, the growing zone 106 may be maintained at a synthesis temperature ranging from about 500° C. to about 1300° C. In another embodiment, the growing zone 106 may be maintained at a synthesis temperature ranging from about 800° C. to about 1200° C. In an additional embodiment, the growing zone 106 may be maintained at a synthesis temperature ranging from about 900° C. to about 1050° C.

In other additional embodiments, the growing zone 106 may be maintained at a synthesis temperature ranging from about 500° C. to about 600° C., from about 550° C. to about 650° C., from about 600° C. to about 700° C., from about 650° C. to about 750° C., from about 700° C. to about 800° C., from about 750° C. to about 850° C., from about 800° C. to about 900° C., from about 850° C. to about 950° C., from about 900° C. to about 1000° C., from about 950° C. to about 1050° C., from about 1000° C. to about 1100° C., from about 1050° C. to about 1150° C., from about 1100° C. to about 1200° C., from about 1150° C. to about 1250° C., and from about 1200° C. to about 1300° C.

The cooling zone 108 of the reactor 100A used in the methods of the present disclosure is typically configured to cool the reactants and/or products in the reactor 100A. In particularly suitable embodiments, the cooling zone 108 is maintained at a cooling temperature below the solidification temperature of one or more reactants or products so as to initiate solidification, freezing, or deposition.

The collection zone 110 of the reactor 100A used in the methods of the present disclosure is typically configured to collect the SWNT 120 produced within the growth zone 106 as well as any unreacted reactants 132 from the reactor 100A. In particularly suitable embodiments, the collection zone 110 is situated at an end of the reactor 100A opposite the injection zone 102.

Figures 4A, 4B:
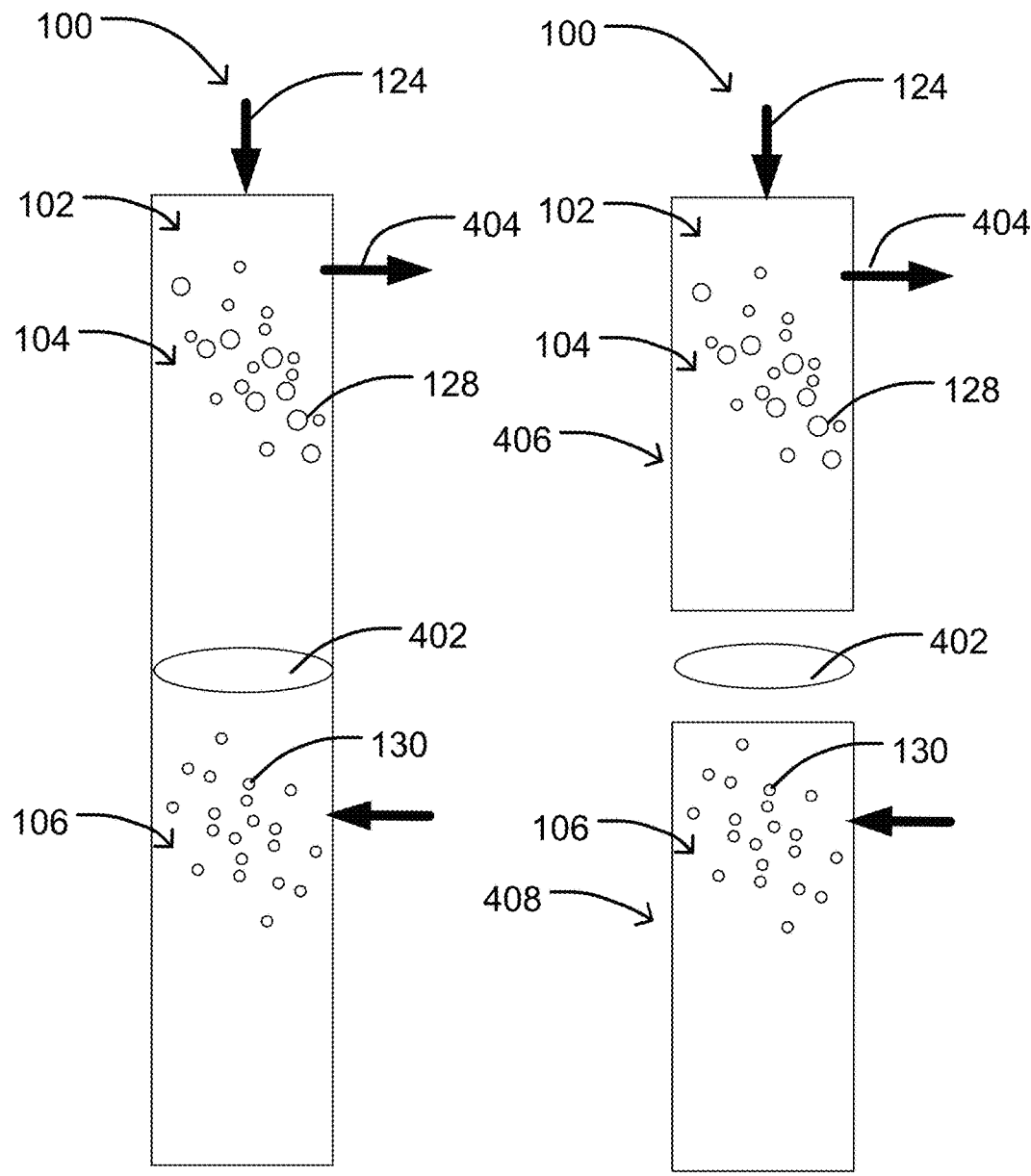
FIGS. 4A and 4B show example implementations of vertical CVD reactors utilized in the methods described herein.

In various other embodiments, the CVD reactor 100 may further include a size selection zone 402, as illustrated in FIGS. 4A and 4B. The optional size selection zone 402 is configured to separate out a catalyst material or catalyst precursor material 128 with a desired particle size distribution. Accordingly, the size selection zone 402 can be provided at any point in the method prior to the growth of nanotubes on the liquid catalyst droplets 130. In a non-limiting example, the size selection zone or step can be performed by using a cylindrical differential mobility analyzer (DMA) and an ultrafine condensation particle counter.

For instance, the particle size and distribution could be determined by on-line aerosol size classification using the DMA and the ultrafine condensation particle counter as described in Lenggoro et al., "Sizing of Colloidal Nanoparticles by Electrospray and Differential Mobility Analyzer Methods," Langmuir, 2002, 18, 4584-4591, which is hereby incorporated by reference to the extent it is consistent herewith. The DMA allows for the isolation of catalyst material or catalyst precursor material particles that fall within a desired range of electrical mobility from a steady stream of charged particles suspended in a gas. The narrow range of electrical mobilities in the aerosol that is classified by the DMA directly translates to a narrow range of particle size. Such controlled particle size distribution provides for a more homogenous growth environment, and the resulting nanotube product.

Without being limited to any particular theory, colloidal chemistry allows for the production of catalyst precursor materials having a narrow particle size distribution, thereby resulting in liquid catalyst droplets having a narrow particle size distribution. Therefore, the use of a size selection step for colloidal catalyst material may be optional. In a non-limiting example, the size selection step may be performed before introduction of the colloidal catalyst particles into the reactor.

However, colloidal catalyst precursors may be expensive to produce. Accordingly, the size selection step allows the use of less expensive catalyst material or catalyst material precursors production methods that would otherwise produce a broad particle size distribution for the liquid catalyst droplets and catalyst material precursors, such as catalyst metalorganic precursors (e.g., metallocene). As shown in FIGS. 4A and 4B, a catalyst material precursor 124, such as a catalyst metallocene precursor 204, is introduced into the reactor 100. The catalyst precursor 124 may be in the form of a solid powder, a solid dispersed in a liquid, or the catalyst material may be dissolved in a solvent 404. In the event the catalyst precursor 124 is dispersed in a liquid or dissolved in a solvent 404, the liquid or solvent 404 is evaporated when introduced into the injection zone 102 and/or decomposition zone 104 of the reactor 100. In addition, if the catalyst material precursor 124 is provided in the form of a catalyst metallocene precursor 204, the catalyst metallocene precursor 204 may be pyrolized to form catalyst particles 128. In some embodiments, the evaporated solvent 404 may be separated from the catalyst particles 128 and ejected from the reactor 100, as illustrated in FIG. 4A and FIG. 4B. In other embodiments, the solvent may be retained along with the catalyst particles 128. By way of non-limiting example, the evaporated solvent 404 may be a carbon-containing solvent such as ethanol that may be evaporated and used as a carbon source 126 in the growing zone 106.

As shown in FIGS. 4A and 4B, the catalyst particles 128 enter the size selection zone 402 so that catalyst particles 128 within the desired particle size distribution are allowed to enter the growing zone. Although FIGS. 4A and 4B illustrate catalyst particles 128 entering the size selection zone 402, the catalyst may alternatively be in the form of liquid catalyst droplets 130 when entering and exiting the size selection zone (not illustrated). The growing zone 106 is maintained at a synthesis temperature that is above the melting point of the catalyst particles 128 so that the catalyst is maintained in the form of liquid catalyst droplets 130. The carbon source 126 is introduced in the growing zone 106 so that nanotubes (not illustrated) are formed on the surface of the liquid catalyst droplets 130.

As shown in FIG. 4A, all of the steps of the method may occur in a single reactor 100, or they may be performed in separate reactor stages 406/408 as shown in FIG. 4B. Therefore, the catalyst particles 128 may be formed at a location separate from the size selection device 402 and the growing zone 106. Alternatively, the catalyst particles 128 may be formed and undergo the size selection step at one location, and introduced to the growing zone 106 at another location.

Figure 5:
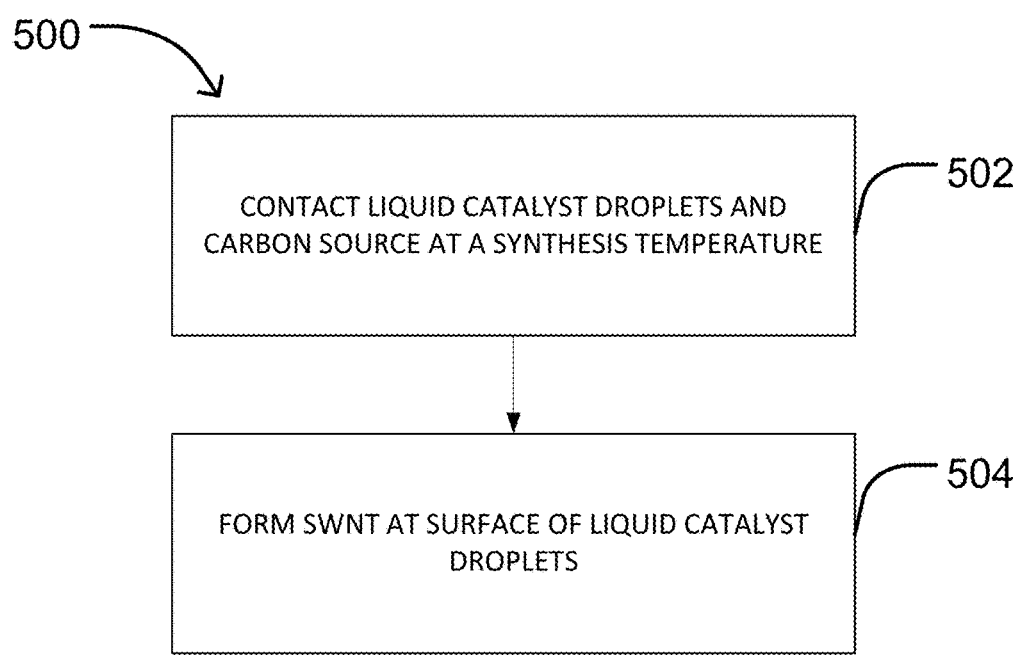
FIG. 5 shows a flow chart representation of an exemplary method of producing SWNT in a CVD reactor.

FIG. 5 is a flow chart of one embodiment of a method 500 of producing single-walled carbon nanotubes (SWNT) in a CVD reactor. Any embodiment of the CVD reactor 100/100A illustrated in FIGS. 1, 2, 4A, and 4B may be used to effectuate this method 500. As illustrated in FIG. 5, the method 500 may include contacting liquid catalyst droplets and a carbon source at a synthesis temperature at step 502. Generally, the method for producing SWNT in a CVD reactor of the present disclosure includes contacting the liquid catalyst droplets described herein above and a carbon source described herein above within the growing zone 106 of the reactor 100/100A described herein above and illustrated in FIGS. 1 and 2. The synthesis temperature may range from about 500° C. to about 1300° C. or may be selected from one of the synthesis temperature ranges provided herein above. As described herein previously, the synthesis temperature may be selected based on any one of at least several factors including but not limited to: the composition of the liquid catalyst drops and the composition of the carbon source.

Referring again to FIG. 5, the method may further include forming the SWNT at the surface of the liquid catalyst droplets at step 504. As described herein above, the SWNT are formed as a result of a catalytic decomposition of the carbon source to elemental carbon at the surface of the liquid catalyst droplets. The SWNT formed at step 504 may be collected for subsequent use (step not shown).

Figure 6:
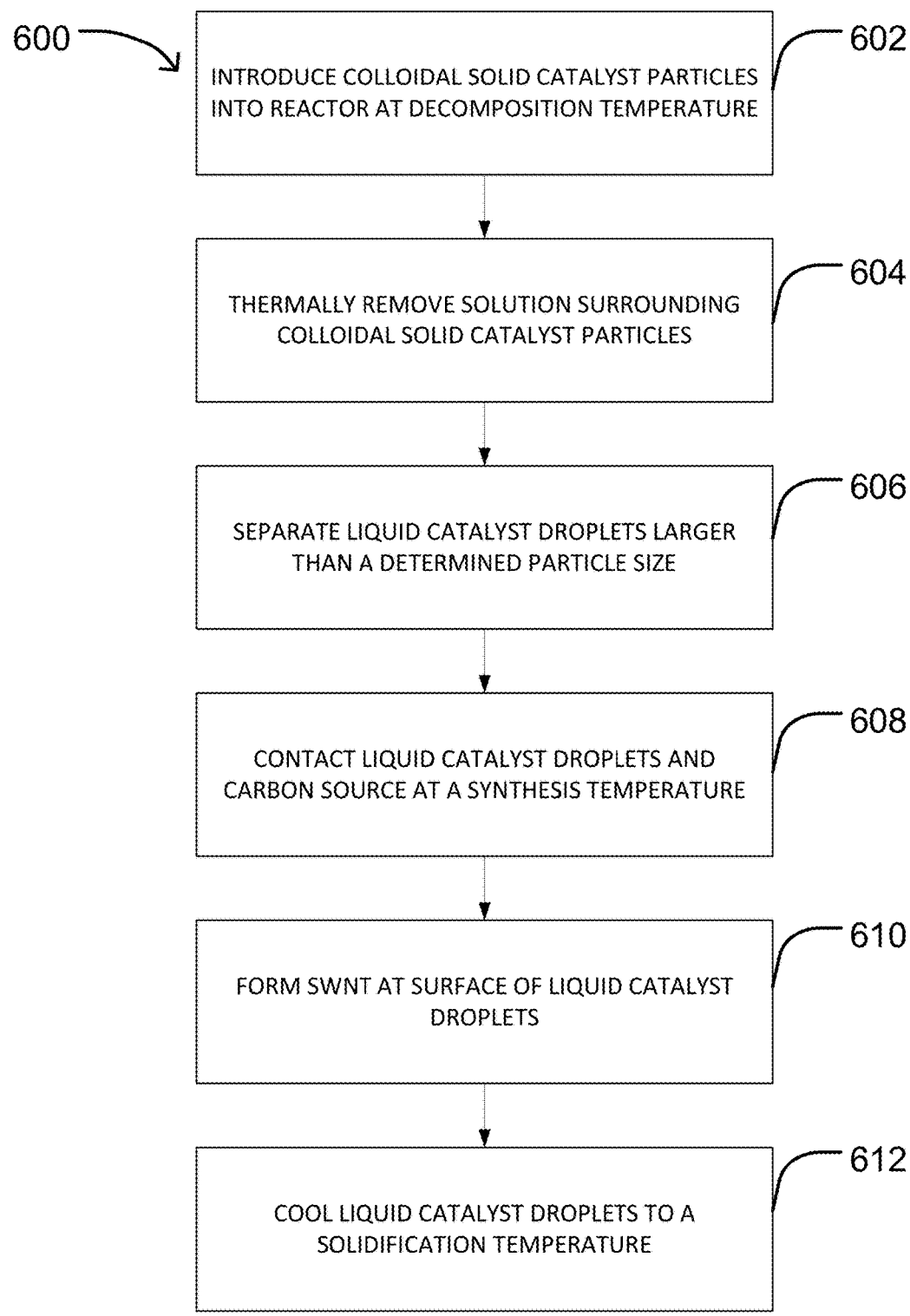
FIG. 6 shows a flow chart representation of an exemplary method of producing SWNT in a CVD reactor using colloidal solid catalyst particles as a catalyst precursor.

FIG. 6 is a flow chart of another embodiment of a method 600 of producing single-walled carbon nanotubes (SWNT) in a CVD reactor. The method 600 includes introducing colloidal solid catalyst particles into the reactor at a decomposition temperature to form liquid catalyst droplets at step 602. By way of non-limiting example, step 602 may be conducted by injecting colloidal solid catalyst particles into an injection zone 102 at one end of a reactor 100 as described herein above and as illustrated in FIG. 1. The colloidal solid catalyst particles may move into a decomposition zone 104 of the reactor 100 as illustrated in FIG. 1 by gravity alone or by any other method of moving particles within a reactor as known in the art. The decomposition zone 104 is maintained at the decomposition temperature. The decomposition temperature may be any decomposition temperature provided herein above, including but not limited to a decomposition temperature ranging from about 200° C. to about 300° C.

The liquid catalyst droplets may be formed at step 602 by melting the colloidal solid catalyst particles as they move through a decomposition zone 104 as illustrated in FIG. 1. Depending on the form in which the colloidal solid catalyst particles are provided, the colloidal solid catalyst particles may be subjected to additional processes. If the colloidal solid catalyst particles are provided as a suspension within a solution, the solution surrounding the colloidal solid catalyst particles may be thermally removed at step 604 as illustrated in FIG. 6. In some embodiments, the solution surrounding the colloidal solid catalyst particles may be evaporated or thermally decomposed in the decomposition zone 104 of the reactor 100 as illustrated in FIG. 1. In a non-limiting example, the thermal decomposition of the solution surrounding the colloidal solid catalyst particles may occur before the melted catalyst (i.e., liquid catalyst droplets) contact the carbon source.

In some embodiments, the liquid catalyst droplets may undergo size selection at step 606. Any known method may be used to subject the liquid catalyst droplets to size selection at step 606 including, but not limited to size selection within a size selection zone 402 of a reactor 100 as illustrated in FIGS. 4A and 4B. By way of non-limiting example, the liquid catalyst droplets may be selected for size using a cylindrical differential mobility analyzer as described herein above. In an embodiment, the catalyst may undergo size selection before contacting the carbon source to promote homogeneous catalyst particle or droplet size and uniform SWNT growth on the droplets.

Referring again to FIG. 6, the method 600 may further include contacting the liquid catalyst droplets and a carbon source at a synthesis temperature at step 608 and forming the SWNT at the surface of the liquid catalyst droplets at step 610. Step 608 and step 610 of method 600 correspond to steps 502 and 504 of method 500 as described herein above. Accordingly, steps 608 and 610 may be conducted as described herein above in connection with steps 502 and 504 of method 500, respectively. As illustrated in FIG. 1, the liquid catalyst droplets 130 move through the reactor 100 and contact a carbon source 126, typically in the growing zone 106. However, it should be understood that this reaction can take place in one or more other zones of the reactor 100 as described herein above without departing from the scope of the present disclosure. As described herein above, the SWNT are produced in the reactor by a decomposition reaction catalyzed along the surface of the liquid catalyst droplets.

The method 600 illustrated in FIG. 6 may further include cooling the liquid catalyst droplets to a solidification temperature at step 612. As illustrated in FIG. 1, the liquid catalyst droplets with attached SWNT 120 formed in the growing zone 106 may be transported into the cooling zone 108 of the reactor 100 using gravity or any other known means of transporting particles within a reactor. Within the cooling zone 108, the liquid catalyst droplets may be solidified, and the solidified catalyst with SWNT thereon may enter the collection zone 110 of the reactor, where the catalyst with SWNT is collected (step not illustrated). To facilitate the solidification of the liquid catalyst drops, the cooling zone 108 may be maintained at a cooling temperature as described herein above. In one embodiment, the cooling temperature may be selected to be a temperature at or below the solidification temperature of the catalyst. In other embodiments, the cooling temperature may be selected to be below the solidification temperature of the catalyst. In these other embodiments, lower cooling temperatures may result in more rapid cooling rates of the liquid catalyst droplets within the cooling zone 108.

Figure 7:
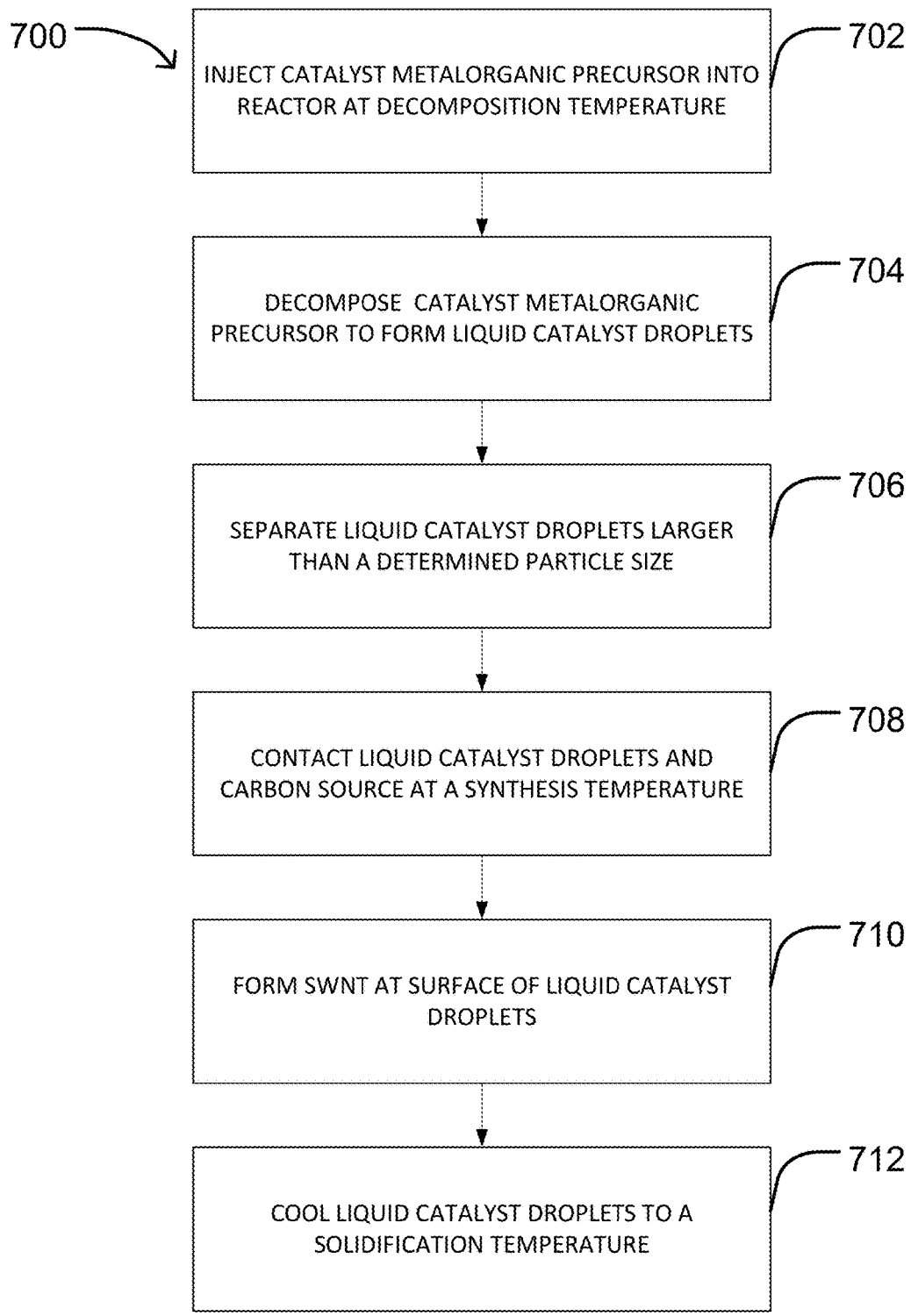
FIG. 7 shows a flow chart representation of an exemplary method of producing SWNT in a CVD reactor using a catalyst metalorganic precursor.

FIG. 7 is a flow chart of an additional embodiment of an exemplary method 700 of producing single-walled carbon nanotubes (SWNT) in a CVD reactor. The method 700 includes injecting a catalyst metalorganic precursor into the reactor at a decomposition temperature at step 702. The catalyst metalorganic precursor may be provided in any form described herein previously including, but not limited to: a solid powder, a solid dispersed in a liquid, or dissolved in a solvent. In the event the catalyst metalorganic precursor is dispersed in a liquid or dissolved in a solvent, the liquid or solvent may be evaporated when introduced into the injection zone 102 and/or decomposition zone 104 of the reactor 100 as described herein previously and illustrated in FIGS. 4A and 4B. In some embodiments, the catalyst metalorganic precursor may be provided in the form of a metallocene as described herein above.

Referring again to FIG. 7, the method may further include decomposing the catalyst metalorganic precursor to form liquid catalyst droplets at step 704. In various embodiments, the catalyst metalorganic precursor may be pyrolized to remove the organic material within the metallocene to form catalyst particles as described herein previously. The resulting catalyst particles may then be melted to form the liquid catalyst droplets. In this method 700, the decomposition temperature may be selected to be higher than the melting temperature of the catalyst, as well as higher than the pyrolysis temperature of the organic materials within the catalyst metalorganic precursor. In various embodiments, the decomposition temperature may range from about 200° C. to about 300° C., or range within any of the other decomposition temperature ranges described herein above.

In some embodiments, the liquid catalyst droplets may undergo size selection at step 706 using any known method including, but not limited to size selection within a size selection zone 402 of a reactor 100 as illustrated in FIGS. 4A and 4B. By way of non-limiting example, the liquid catalyst droplets may be selected for size using a cylindrical differential mobility analyzer as described herein above. In an embodiment, the catalyst may undergo size selection before contacting the carbon source to promote homogeneous catalyst particle or droplet size and uniform SWNT growth on the droplets.

Referring again to FIG. 7, the method 700 may further include contacting the liquid catalyst droplets and a carbon source at a synthesis temperature at step 708 and forming the SWNT at the surface of the liquid catalyst droplets at step 710. Step 708 and step 710 of method 700 correspond to steps 502 and 504 of method 500 and may be conducted as described herein above in connection with steps 502 and 504 of method 500, respectively. As illustrated in FIG. 1, the liquid catalyst droplets 130 move through the reactor 100 and contact a carbon source 126, typically in the growing zone 106. However, it should be understood that this reaction can take place in one or more other zones of the reactor 100 as described herein above without departing from the scope of the present disclosure. As described herein above, the SWNT are produced in the reactor by a decomposition reaction catalyzed along the surface of the liquid catalyst droplets.

The method 700 illustrated in FIG. 7 may further include cooling the liquid catalyst droplets to a solidification temperature at step 712. In this embodiment, step 712 of method 700 corresponds to step 612 of method 600 and may be conducted as described herein above in connection with step 612 of method 600.

It should be understood by one skilled in the art that while the instant disclosure discusses many of the steps of the method in one or more zones of the reactor, any of the steps can be performed in any one or combination of the zones as commonly known in the CVD reactor art without departing from the scope of the present disclosure.

In another method (not illustrated) of the present disclosure, a SWNT is produced in a vertical CVD reactor by injecting a catalyst metallocene precursor into the injection zone at one end of the reactor. The catalyst metallocene precursor enters the decomposition zone of the reactor, wherein the organic material within the metallocene is decomposed. Typically, the decomposition zone has a temperature of from about 200-300° C. Catalyst moving through the decomposition zone is contiguously melted into liquid catalyst droplets. Thereafter, the catalyst droplets moving through the reactor contact a carbon source. SWNT are produced accordingly in the growing zone of the reactor along the surface of the catalyst droplets. The catalyst droplets and SWNT move into the cooling zone of the reactor, which solidifies the catalyst droplets. Solidified catalyst and SWNT enter the collection zone of the reactor.

In still another method of the present disclosure (not illustrated), a SWNT may be produced in a horizontal CVD reactor 100A by placing powdered catalyst metallocene precursor 210 into a carrier 212 as illustrated in FIG. 2. The carrier 212 is then placed in the decomposition zone 104 of the reactor 100A, wherein the organic material within the metallocene is decomposed. In a non-limiting example, the decomposition zone 104 is maintained at a decomposition temperature ranging from about 200° C. to about 300° C. The catalyst metallocene precursor may be contiguously melted or evaporated. A carrier gas, including but not limited to the gases described herein above, transports the catalyst particles 130 to a growing zone 106 in the reactor 100A maintained at a synthesis temperature higher than the melting point of the catalyst. The resulting liquid catalyst droplets contact the carbon source within the growing zone 106, and SWNT are produced accordingly along the surface of the liquid catalyst droplets. The liquid catalyst droplets and SWNT enter the cooling zone 108 of the reactor 100A, which solidifies the catalyst droplets. Solidified catalyst and SWNT enter the collection zone 110 of the reactor 100A.

Although described herein with respect to vertical and horizontal reactors configured perpendicular to each other, it is to be understood that the reactors are not limited to such configurations and that they can be oriented at any angle with respect to horizontal and/or vertical. In addition, any form of catalyst or catalyst precursor material may be used in the reactors, as the reactor configurations are not limited to the use of only solids, solids dispersed in liquids, or liquids.

It is also to be understood that the methods disclosed herein may be performed in a continuous manner characterized by the continuous introduction of the catalyst and the carbon source to the growing zone to continuously grow carbon nanotubes. Accordingly, a greater volume of carbon nanotubes may be produced as compared to conventional batch methods.

Methods of producing SWNT in a reactor are described herein above in detail. The methods are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

EXAMPLES

Example 1: Synthesis of Ru Nanoparticles

To demonstrate a method of forming Ru nanoparticles suitable for use as a catalyst precursor in the methods described herein above, the following experiment was conducted.

0.02 g of $RuCl_3 \cdot xH_2O$ was dissolved in 25 mL of ethylene glycol. $N_2$ gas was bubbled through the precursor solution vigorously while maintaining the solution at a temperature of about 50° C. to remove air and moisture from the solution. After about ten minutes, the flow rate of the $N_2$ gas was decreased and the temperature of the precursor solution was increased to 105° C. for 7 min. At this temperature, 0.10 g of sodium acetate dissolved in 5 mL ethylene glycol was injected quickly into precursor solution, accompanied by a change in color of the precursor solution to black. The temperature of the precursor solution was further increased to 155° C. and subsequently 187° C. for an additional 1.5 hr.

The precursor solution was cooled, resulting in the precipitation of Ru nanoparticles from the precursor solution. The Ru nanoparticles were separated by centrifugation and washed two times with ethanol. Half of the resulting precipitate of Ru nanoparticles was dispersed in 0.15 g of oleic acid and 0.1 g of oleylamine for hexagonal close-packed (hcp) Ru nanoparticles. This solution was sonicated for 30-60 min, stirred for 30 min, and again sonicated for 30 min. The precipitate of this solution was isolated by centrifugation and washed two times with ethanol.

Figure 8:
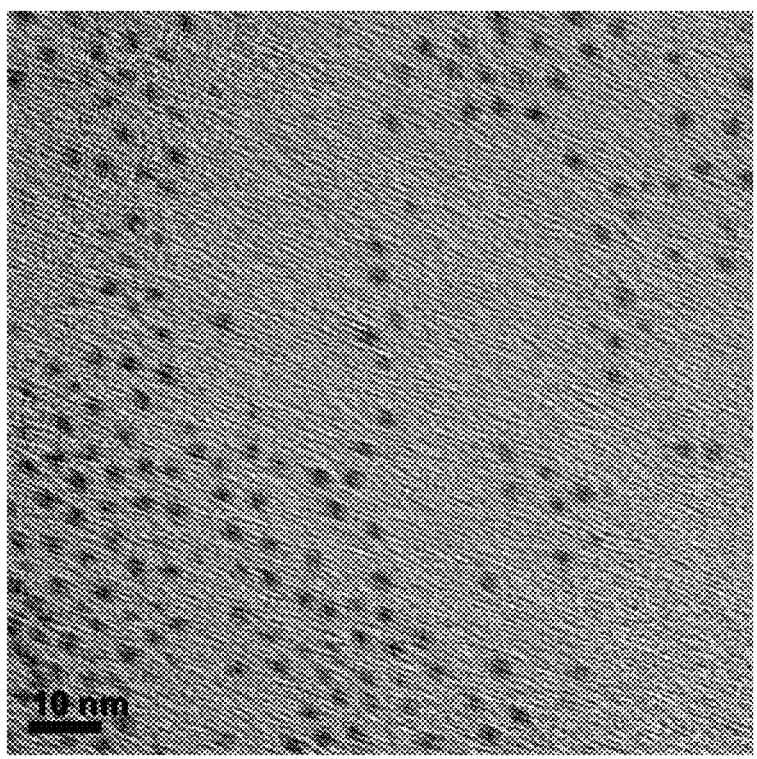
FIG. 8 shows a TEM image of hcp Ru nanoparticles suitable for use as a catalyst using the methods described herein.

FIG. 8 is a TEM image of the hcp Ru nanoparticles formed as described above. The particle size of the hcp Ru nanoparticles was about 2 nm to about 2.5 nm with high dispersity, high purity, and narrow size distribution.

The results of this experiment demonstrated a method of forming Ru nanoparticles suitable for use as a catalyst precursor in the methods described herein above.

Example 2: Synthesis of In Nanoparticles

To demonstrate a method of forming In nanoparticles suitable for use as a catalyst precursor in the methods described herein above, the following experiment was conducted.

0.17 g of $InCl_3$ was dissolved in 5 mL of TOP (trioctylphosphine) and 10 mL of THF (tetrahydrofuran) at room temperature. Once the indium chloride had completely dissolved, 4 mL of superhydride solution was injected into the precursor solution. Within a few minutes, large agglomerates formed within the solution. The solution was exposed to air and stirred for an additional 2-4 hours. The In nanoparticles were separated by centrifugation and washed two times with ethanol.

Figure 9:
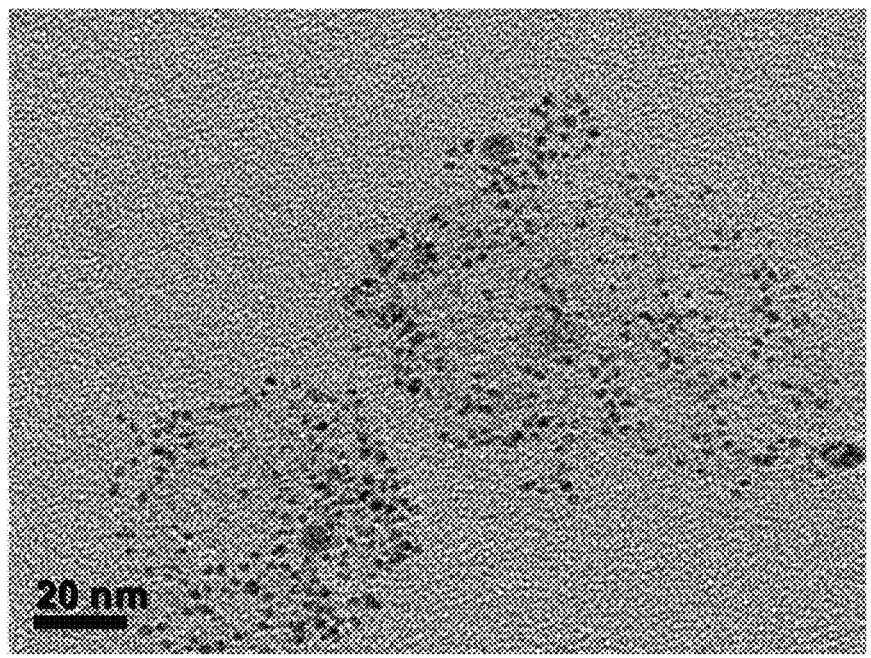
FIG. 9 shows a TEM image of In nanoparticles suitable for use as a catalyst using the methods described herein.

FIG. 9 is a TEM image of the resulting In nanoparticles formed as described above. The particle size of the In nanoparticles was about 2 nm with high dispersity, high purity, and narrow size distribution.

The results of this experiment demonstrated a method of forming In nanoparticles suitable for use as a catalyst precursor in the methods described herein above.

Example 3: Production of SWNT Using Liquid Catalyst Droplets

To demonstrate the method of producing single-walled carbon nanotubes (SWNT) using the methods described herein above, the following experiments were conducted.

A suspension of 0.4 wt % of gallium (III) acetylacetonate $(Ga(acac)_3)$ in ethanol was introduced into a vertical CVD reactor similar to the reactor illustrated in FIG. 1 at a liquid injection rate of about 6 ml/hr. In addition, argon was introduced into the reactor at a rate of about 450 sccm and hydrogen was introduced at a rate of 75 sccm as carrier gases. The acetylacetonate was pyrolyzed from the $Ga(acac)_3$ and the remaining gallium was melted to form liquid gallium catalyst droplets. The liquid gallium droplets were contacted with the ethanol carbon source for about 15 minutes at a synthesis temperature of about 900° C. to form the SWNT. The liquid gallium droplets with attached SWNT were cooled and collected for subsequent analysis. This experiment was repeated at a synthesis temperature of about 925° C.

Figure 10:
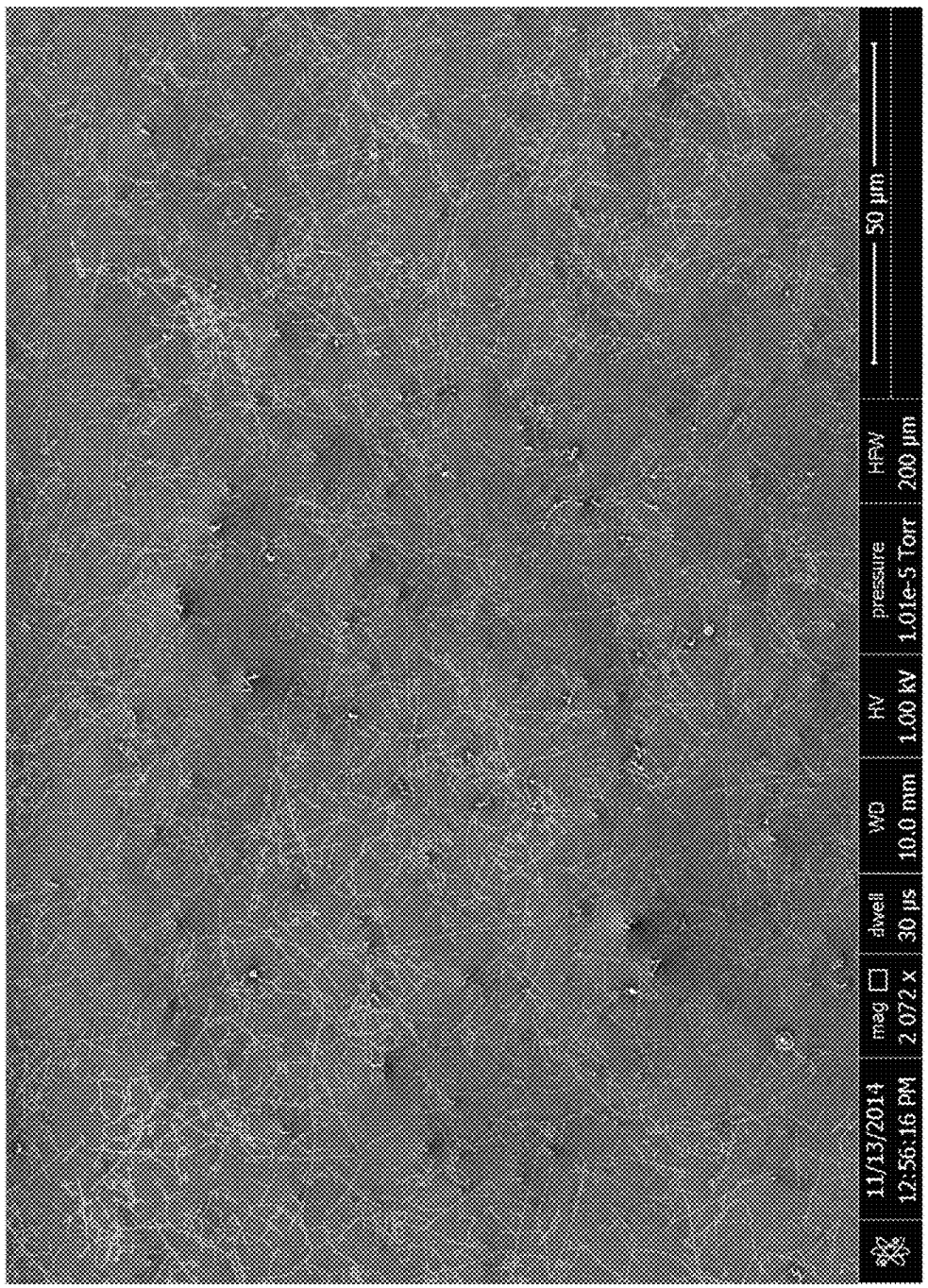
FIG. 10 shows a TEM image of nanotubes formed using gallium (III) acetylacetonate in ethanol as a catalyst precursor at a growth temperature of about 900° C. using the methods described herein.
Figure 11:
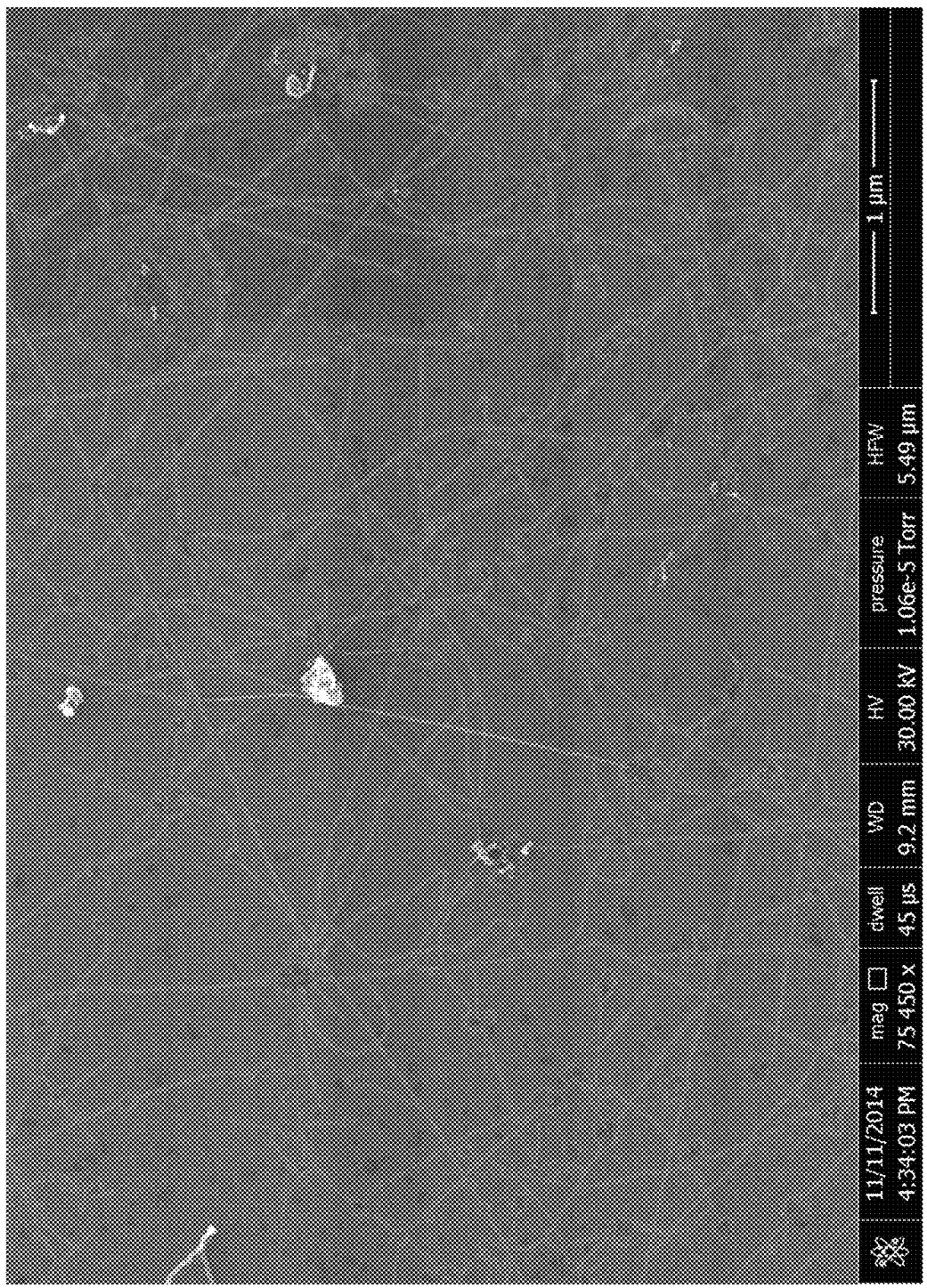
FIG. 11 shows a TEM image of nanotubes formed using gallium (III) acetylacetonate in ethanol as a catalyst precursor at a growth temperature of about 925° C. using the methods described herein.
Figure 12:
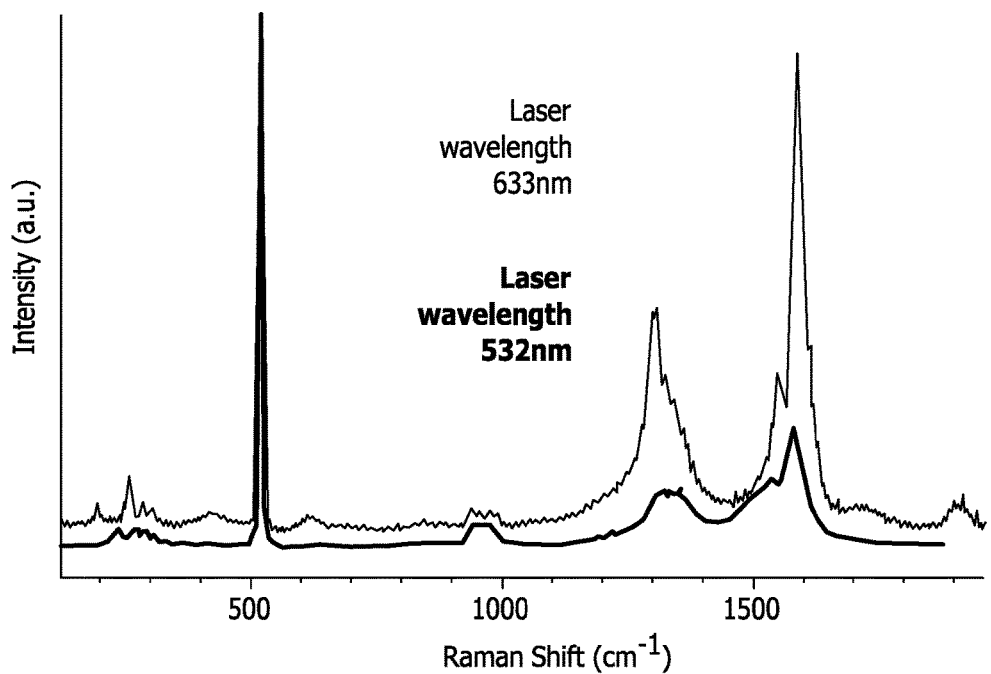
FIG. 12 shows Ramen spectra of nanotubes formed using the methods described herein.
Figure 13:
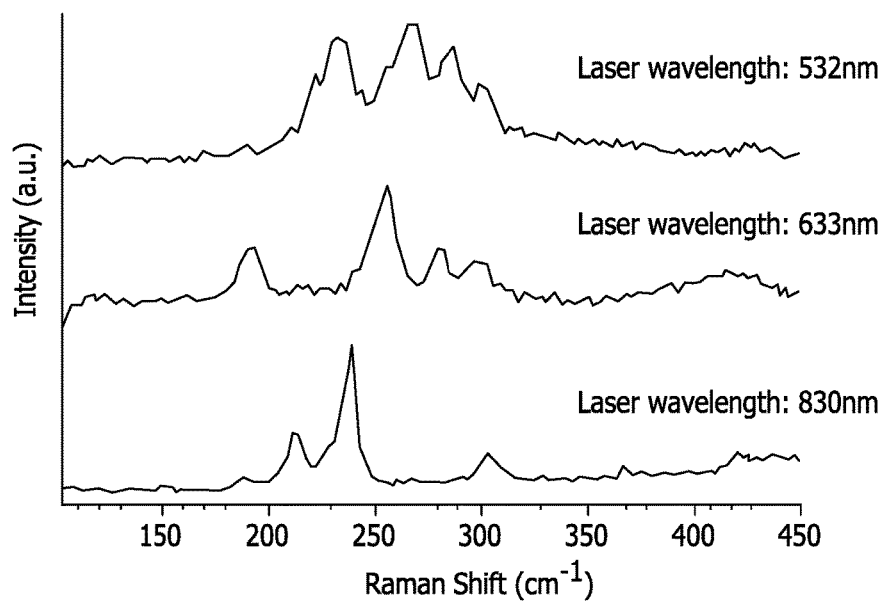
FIG. 13 shows Ramen spectra of nanotubes formed using the methods described herein, and showing the radial breathing modes.

FIG. 10 is a TEM image of the SWNT formed using the method described above at a synthesis temperature of about 900° C., and FIG. 11 is a TEM image of the SWNT formed using the method described above at a synthesis temperature of about 925° C. Both TEM images indicate the presence of nanotubes in the samples. FIG. 12 is a graph summarizing typical Raman spectra obtained from samples of the SWNT, and FIG. 13 is a zoomed-in graph of Raman spectra obtained from samples of SWNT. As illustrated in FIG. 13, Raman spectra are characterized by radial breathing modes indicative of SWNT.

The results of these experiments demonstrated that SWNT may be produced using the methods described herein above.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art.

What is claimed is:

1. A method for producing a single-walled carbon nanotube in a chemical vapor deposition (CVD) reactor comprising:
    forming an unsupported liquid metal catalyst droplet in the CVD reactor at a decomposition temperature, wherein the decomposition temperature is higher than a melting temperature of the unsupported liquid metal catalyst droplet;
    contacting the unsupported liquid metal catalyst droplet and a carbon source in the CVD reactor at a synthesis temperature, wherein the synthesis temperature is higher than the decomposition temperature; and
    forming a single walled carbon nanotube at the surface of the unsupported liquid metal catalyst droplet.

2. A method for producing a single-walled carbon nanotube in a chemical vapor deposition (CVD) reactor comprising:
    introducing colloidal solid catalyst particles into a decomposition zone in the reactor maintained at a decomposition temperature above the melting point of the catalyst particles to form unsupported liquid catalyst droplets within the reactor;
    contacting the unsupported liquid catalyst droplets and a carbon source within a growing zone in the reactor maintained at a synthesis temperature above the decomposition temperature; and
    forming a single walled carbon nanotube at the surface of the unsupported liquid catalyst droplets within the growing zone.

3. The method in accordance with claim 2, further comprising thermally removing the solution surrounding the colloidal solid catalyst particles within the decomposition zone.

4. The method in accordance with claim 2, further comprising removing the unsupported liquid catalyst droplets larger than a determined particle size.

5. The method in accordance with claim 2, further comprising cooling the unsupported liquid catalyst droplets to a solidification temperature within a cooling zone in the reactor maintained at a cooling temperature below a solidification temperature of the unsupported liquid catalyst droplets.

6. The method in accordance with claim 2, wherein the catalyst particles comprise a material selected from the group consisting of iron, nickel, cobalt, copper, chromium, indium, gallium, platinum, manganese, cerium, europium, ytterbium, silver, gold, zinc, cadmium, lanthanum, and combinations thereof.

7. The method in accordance with claim 2, wherein the carbon source is a material selected from the group consisting of carbon monoxide, ethanol, aliphatic hydrocarbons, oxygenated hydrocarbons, aromatic hydrocarbons, and mixtures thereof.

8. The method in accordance with claim 2, wherein the reactor is in a vertical configuration.

9. The method of claim 8, further comprising injecting the colloidal solid catalyst particles into an injection zone at one end of the reactor, wherein the colloidal solid catalyst particles move into the decomposition zone by gravity to be melted to form the liquid catalyst droplets.

10. A method of producing a single-walled carbon nanotube comprising:
    injecting a catalyst metalorganic precursor comprising a catalyst into a decomposition zone of a chemical vapor deposition (CVD) reactor at a decomposition temperature above the melting point of the catalyst to remove the organic material and to form unsupported liquid catalyst droplets within the reactor;
    contacting the unsupported liquid catalyst droplets and a carbon source in a growth zone of the reactor at a synthesis temperature above the decomposition temperature; and
    growing the single-walled carbon nanotube at the surface of the unsupported liquid catalyst droplets in the growth zone.

11. The method in accordance with claim 10, further comprising removing the unsupported liquid catalyst droplets larger than a determined particle size.

12. The method in accordance with claim 10, further comprising cooling the unsupported liquid catalyst droplets in a cooling zone to a solidification temperature.

13. The method in accordance with claim 10, wherein the catalyst is a material selected from the group consisting of iron, nickel, cobalt, copper, chromium, indium, gallium, platinum, manganese, cerium, europium, ytterbium, silver, gold, zinc, cadmium, lanthanum, and combinations thereof.

14. The method in accordance with claim 10, wherein the carbon source is a material selected from the group consisting of carbon monoxide, ethanol, aliphatic hydrocarbons, oxygenated hydrocarbons, aromatic hydrocarbons, and mixtures thereof.

15. The method in accordance with claim 10, wherein the decomposition temperature ranges from about 150° C. to about 400° C.

16. The method in accordance with claim 10, wherein the synthesis temperature ranges from about 500° C. to about 1300° C.

17. The method in accordance with claim 10, wherein the unsupported liquid catalyst droplets and the carbon source are contacted in a growing zone of the reactor.

18. The method in accordance with claim 10, wherein the method continuously produces single-walled carbon nanotubes in the chemical vapor deposition (CVD) reactor.

19. A method of producing a single-walled carbon nanotube comprising:

injecting a powdered catalyst metalorganic precursor comprising a catalyst into a carrier gas in a decomposition zone of a chemical vapor deposition (CVD) reactor at a decomposition temperature above the melting point of the catalyst to remove the organic material and to form liquid catalyst droplets;

transporting the liquid catalyst droplets from the decomposition zone of the reactor to a growing zone of the reactor with the carrier gas;

contacting the liquid catalyst droplets and a carbon source in the growing zone at a synthesis temperature above the decomposition temperature; and growing the single-walled carbon nanotube at the surface of the liquid catalyst droplets.

20. The method in accordance with claim 19, wherein the reactor is configured horizontally.

21. The method in accordance with claim 19, wherein the catalyst is a material selected from the group consisting of iron, nickel, cobalt, copper, chromium, indium, gallium, platinum, manganese, cerium, europium, ytterbium, silver, gold, zinc, cadmium, lanthanum, and combinations thereof.

22. The method in accordance with claim 19, wherein the carbon source is a material selected from the group consisting of carbon monoxide, ethanol, aliphatic hydrocarbons, oxygenated hydrocarbons, aromatic hydrocarbons, and mixtures thereof.

23. The method in accordance with claim 19, wherein the carrier gas is a material selected from the group consisting of hydrogen, helium, argon, neon, krypton, xenon, and mixtures thereof.

24. The method in accordance with claim 19, wherein a plurality of single-walled carbon nanotubes are grown on the surface of the liquid catalyst droplets.

25. The method in accordance with claim 19, wherein the decomposition temperature and the synthesis temperature are below a vaporization temperature of the liquid catalyst droplets.

26. The method in accordance with claim 19, wherein the method continuously produces single-walled carbon nanotubes in the chemical vapor deposition (CVD) reactor.

* * * * *